(12) United States Patent
Hughes et al.

(10) Patent No.: US 6,219,585 B1
(45) Date of Patent: Apr. 17, 2001

(54) THREE DIMENSIONAL LOG SCANNING DEVICE FOR A LOG POSITIONING AND SAW SYSTEM

(75) Inventors: Michael G. Hughes, Norwich; William A. Rousseau, Bethel, both of VT (US)

(73) Assignee: Silvatech Corporation, Bethel, VT (US)

( * ) Notice: Subject to any disclaimer, the term of this patent is extended or adjusted under 35 U.S.C. 154(b) by 0 days.

(21) Appl. No.: 08/278,153

(22) Filed: Jul. 21, 1994

(51) Int. Cl.[7] .................. G06F 19/00; B23Q 15/00
(52) U.S. Cl. .................. 700/167; 702/155; 144/357; 144/416
(58) Field of Search .................. 83/559, 73; 144/356, 144/357, 363, 367, 402, 416; 700/167; 702/155, 158, 170

(56) References Cited

U.S. PATENT DOCUMENTS

| | | | |
|---|---|---|---|
| 4,139,035 | * | 2/1979 | Bystedt et al. ............... 144/312 |
| 4,197,888 | * | 4/1980 | McGee et al. ................ 144/209 A |
| 4,262,572 | * | 4/1981 | Flodin ........................... 83/471.2 |
| 4,294,149 | * | 10/1981 | Olsson ............................ 83/435.1 |
| 4,412,297 | * | 10/1983 | Halgrimson et al. ............ 364/559 |
| 4,468,993 | * | 9/1984 | McCown et al. .................. 83/112 |
| 4,839,816 | * | 6/1989 | Cattrall et al. ................ 364/474.09 |
| 4,879,659 | * | 11/1989 | Bowlin et al. ................... 364/468 |
| 4,907,294 | * | 3/1990 | Bolton et al. ................ 364/474.09 |
| 4,926,917 | * | 5/1990 | Kirbach ............................ 144/356 |
| 4,941,100 | | 7/1990 | McFarlane et al. ........... 364/474.09 |
| 5,251,141 | * | 10/1993 | Payr ............................. 364/474.09 |
| 5,394,342 | * | 2/1995 | Poon .............................. 364/558 |

OTHER PUBLICATIONS

James C. Green, Pres., 3–D Log Scanning and Optimization, Oct. 20, 1993, 16 pp.

* cited by examiner

*Primary Examiner*—Paul P. Gordon
(74) *Attorney, Agent, or Firm*—Sughrue, Mion, Zinn, Macpeak & Seas, PLLC

(57) ABSTRACT

A scanning device for determining the shape of irregular substantially cylindrical objects. Lines of light are projected onto the surface of the object. The position of the images of the lines on the surface are measured at predetermined positions to obtain a three dimensional profile of the object. The device can be incorporated into a log cutting system and the position of the log can be adjusted based on the profile determination to obtain maximum yield from the log.

9 Claims, 6 Drawing Sheets

THREE DIMENSIONAL LOG SCANNING DEVICE FOR A LOG POSITIONING AND SAW SYSTEM

SUMMARY OF THE INVENTION

1. Field of the Invention

The invention relates to a scanning device for determining the shape of irregular cylindrical objects. More specifically, the invention relates to a laser scanning device which can determine the shape of a log in three dimensions to allow a log to be properly positioned during a sawing operation in order to maximize the yield from a log.

2. Description of the Related Art

It is well known to utilize a scanner to control the position of a log during a sawing operation. A conventional log scanning system is illustrated in FIG. 1. A row of photo-emitters 2 is positioned above log L which is movably supported on a saw apparatus by headblocks 6. A row of photoreceivers is disposed below log L in opposition to the row of photoemitters 2. Each photoemitter is directed toward a corresponding photoreceiver. In this manner, the outline of front edge 7 of log L can be determined as log L is moved into the path of the light emitted by the photoreceivers while simultaneously monitoring the position of headblocks 6. An outline of back edge 8 of log L can be obtained by the relative positions of each headblock 6 (see FIG. 2). Combining the two outlines (front edge and back edge) provides a horizontal longitudinal log profile which can be used to detect curvature of the log in the horizontal plane (see FIG. 2). Since this type of system does not measure curvature of log L in the vertical plane, the sawing pattern of log L must be determined on the assumption that there is not curvature in the vertical plane. This assumption is usually erroneous and thus causes error in determining optimum sawing patterns (see FIG. 3).

A primary function of a log scanner is to properly position the log with respect to a vertical sawblade so that slab can be removed on the first cut which enables the first board removed (on the second cut) to be of a minimum width and length after round edges thereof have been removed. Of course, the board must also be straight. If log position for this open face is determined by the conventional scanner discussed above, any curvature in the vertical plane will cause the resulting board to be curved. Such a board cannot be edged to the desired width unless a large amount of extra wood is removed from log L to compensate for the error. This is wasteful of time and natural resources In addition, to the device disclosed above, it is well known to use a laser to scan a log in two dimensions as the log is moved through the path of the laser. Such a device is disclosed in U.S. Pat. No. 4,941,100 (issued Jul. 10, 1990) and is useful to allow control of a vertical edger which removes top and bottom portions of a log to allow a rectangular board to be cut. However, because such a device also determines contour in only two dimensions, it does not aid in determining the proper thickness of a slab in order to open the face of the log for optimum yield.

SUMMARY OF THE INVENTION

An object of the invention is to provide a log position control device which can accurately position the log for a sawing operation in order to maximize the yield of the log.

Another object of the invention is to position a log to allow a first cut of a saw operation to open a face of the log which is just high enough to allow the desired sized board to be cut during the second saw operation.

A still further object of the invention is to provide an apparatus which can easily determine the contour of a log in three dimensions.

These objects are achieved by directing beams from a series of line projecting lasers onto a log which is to be cut. A camera is positioned in opposition to the log to detect the position of the laser beam lines on the log. The position of the headblocks is also detected. A three dimensional contour of the log is determined by the position and straightness of the laser lines as a function of headblock position.

DETAILED DESCRIPTION OF THE PREFERRED EMBODIMENT

Figure 6:
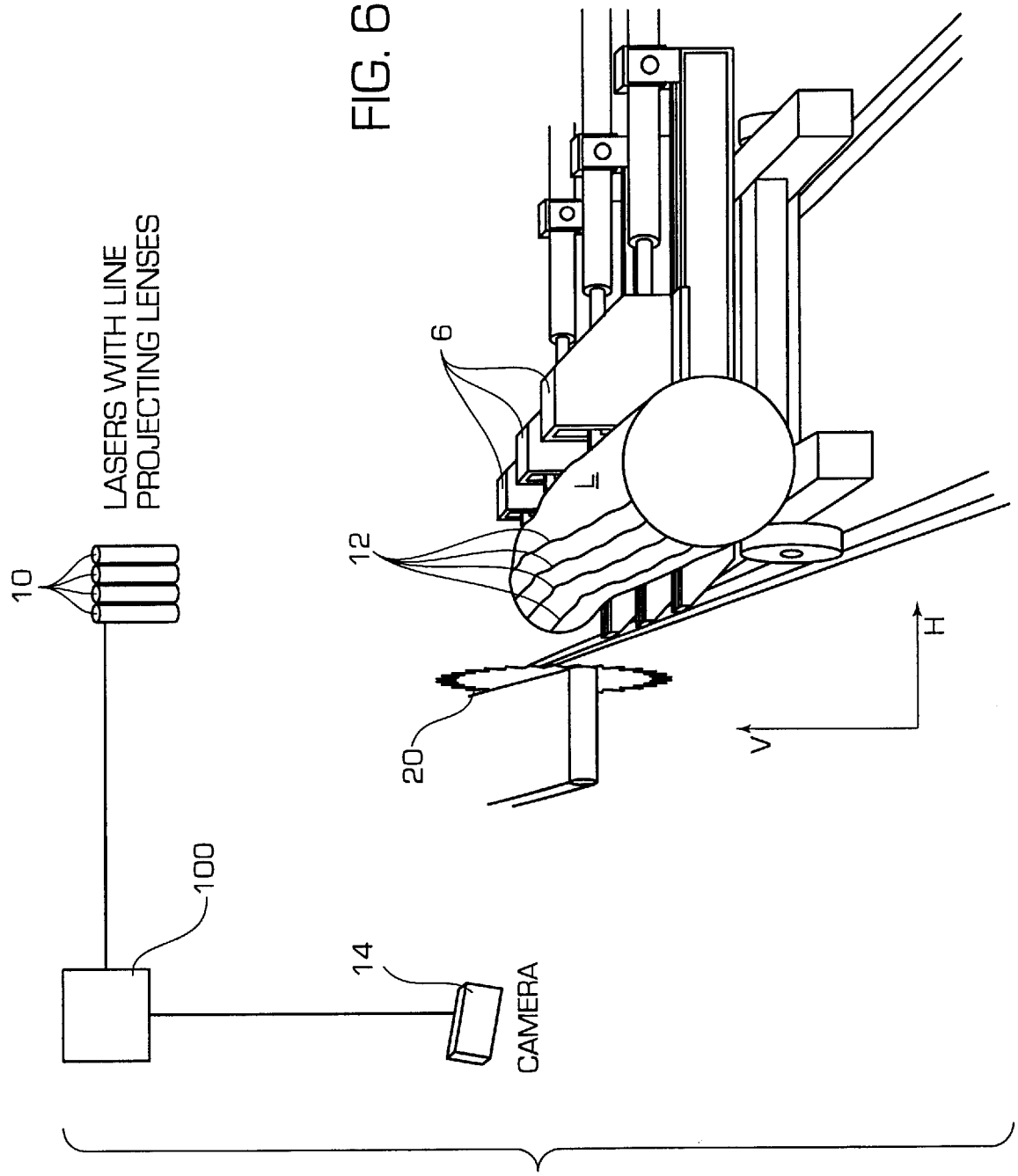
FIG. 6 is a perspective view of the preferred embodiment of the invention.

FIG. 6 illustrates a preferred embodiment of the invention. Log L is movably supported in a headsaw system by headblocks 6 in a known manner. Head blocks 6 can be moved through known means such as cylinder piston arrangements, or the like. Further, position of head blocks 6 can be monitored in a known manner. At least one line projecting laser 10 is positioned above log L to project a line 12 onto a cutting area proximate sawblade 20. The preferred embodiment uses four lasers 10 and thus four lines 12 are projected onto the log. Camera 14 is positioned to the cutting area in a field of view thereof. Camera 14 of the preferred embodiment is positioned in advance of the log and slightly above the log. However, the camera can be positioned in any appropriate position as long the cutting area is in its field of view.

Figure 1:
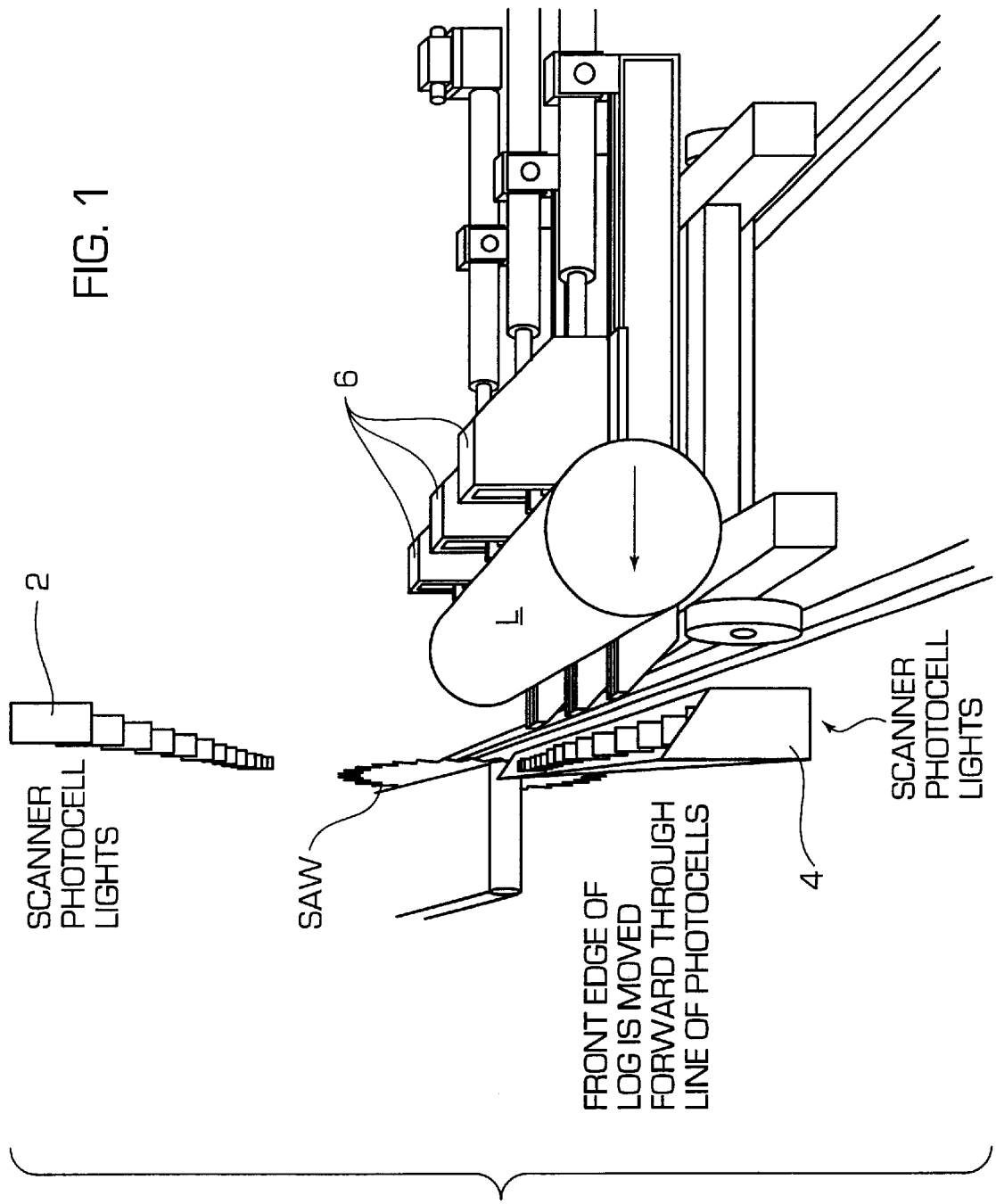
FIG. 1 is a perspective view of a conventional log position scanning system.
Figure 2:
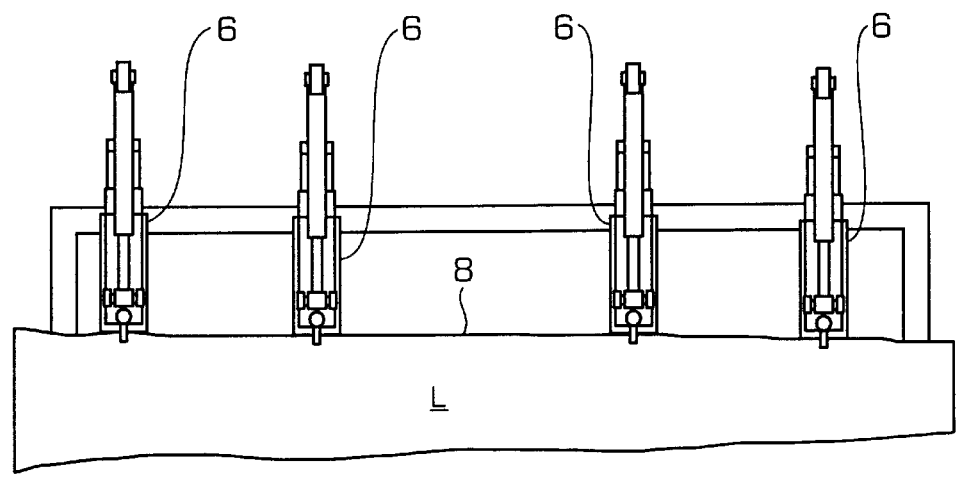
FIG. 2 is top view of a portion of the device illustrated in FIG. 1.
Figure 3:
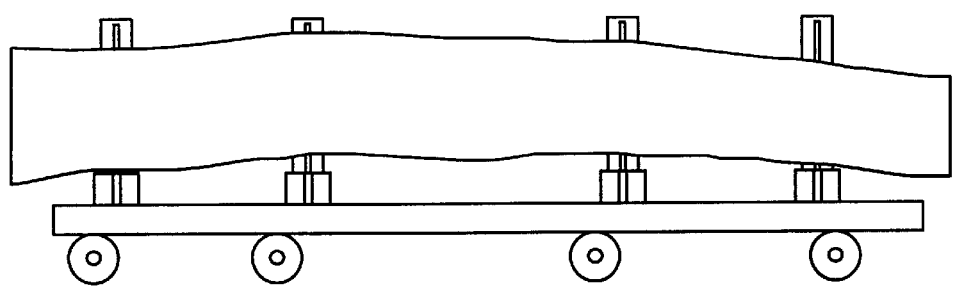
FIG. 3 is a side view of a log having curvature in a vertical plane.
Figure 4:
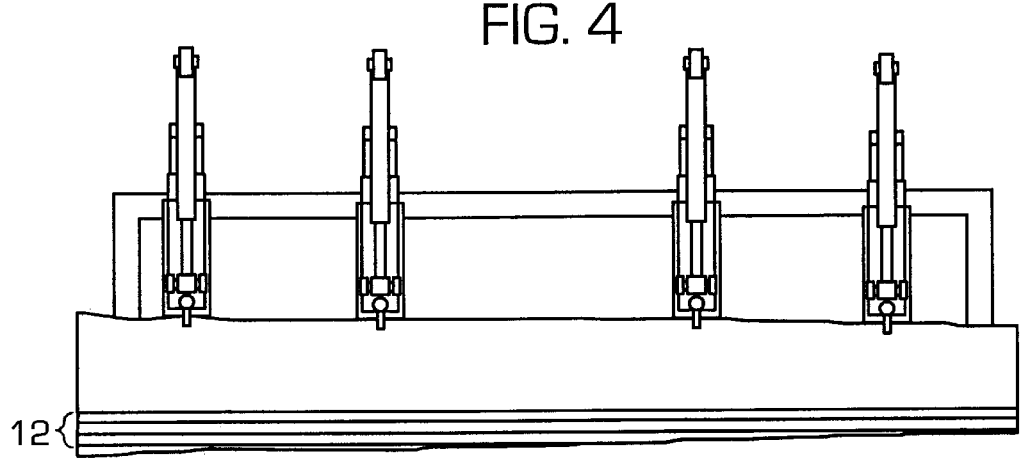
FIG. 4 is a top view of a log when it is placed in the preferred embodiment of the invention.
Figure 5:
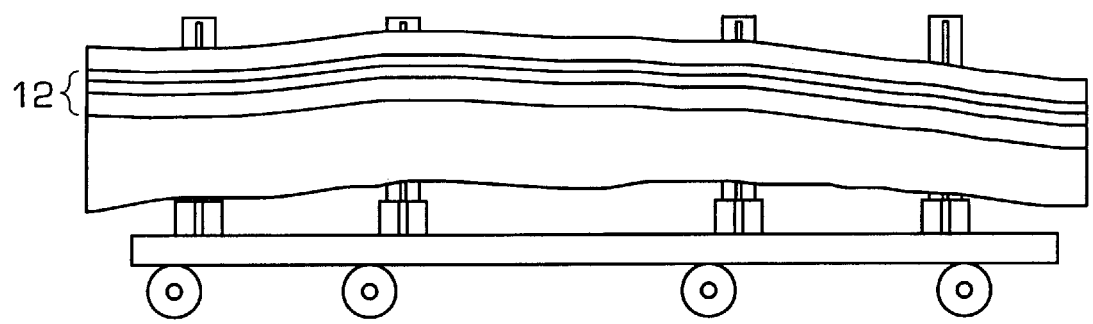
FIG. 5 is a side view of a log placed in the preferred embodiment of the invention.

Log L is moved forward (toward sawblade 20 along horizontal axis H) and eventually enters the cutting area. The position of headblocks 6 when light from one of lasers 6 first appears on a surface of log L indicates the outline of the front edge of the log and allows the horizonal profile of log L, in the horizontal axis H, to be calculated, in a manner similar to the conventional manner described above (see FIG. 4). However, the camera also detects the straightness of the laser lines reflected off of the surface of log L and thus the straightness of log L in the vertical axis V (see FIG. 5). Of course, the position of headblocks 6, lasers 10 and camera 14 is known at all times. Accordingly, position adjustments can be made to headblocks 6 to position the log properly.

Particularly, because both the horizontal profile of the log and the vertical curvature of log L is known, the log can be positioned to allow sawblade 20 to remove a slab on the first cut so that a first board taken on the second cut will be of minimum width and length and straight after rounded edges are removed from the board. This allows the log to be cut efficiently. A sawing operation is accomplished by moving log L relative to sawblade 20 in a direction perpendicular to horizontal axis H.

The entire operation can be controlled by controller 100. The camera can use known circuitry, such as a CCD device or the like, to detect the line images. Also, known processing circuitry, such as a microprocessor based device, can be used for controller 100.

Figure 8:
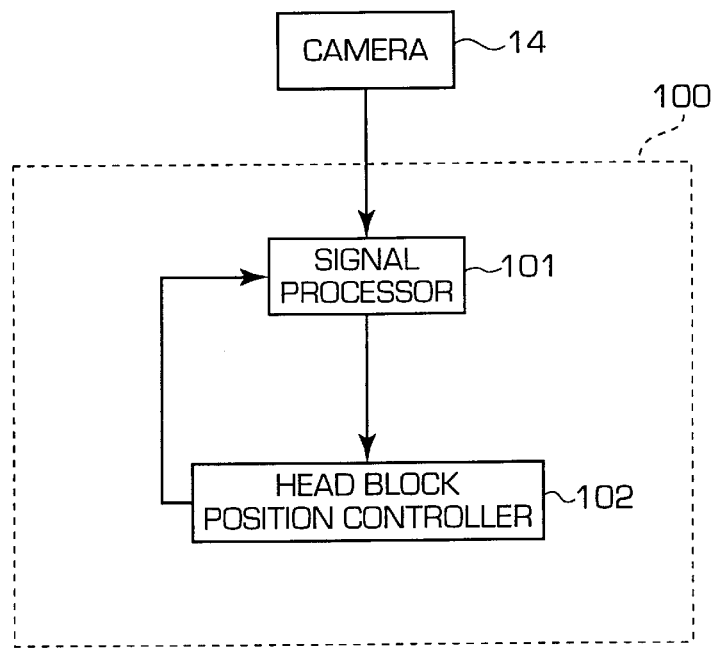
FIG. 8 is a schematic illustration of the signal processing unit of the preferred embodiment.

FIG. 8 illustrates the components which constitute a signal processing unit of the preferred embodiment. Camera 14 outputs a signal, such as a bit-mapped signal, to signal processor 101. Signal processor 101 determines the position of a plurality of points on each of the projected lines. Signal processor 101 also receives a position signal from headblock position controller 102 and outputs a signal to headblock position controller 102 to properly position the log. Signal processor 101 and headblock position controller 102 can be part of controller 100, e.g. a programmed subroutine, or they can be separate microprocessor based devices or the like.

Figure 9:
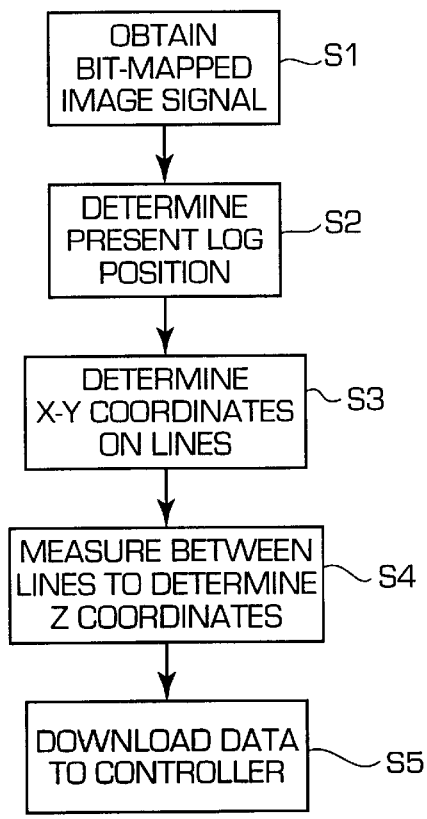
FIG. 9 is a flowchart of the process for determining contour.

FIG. 9 illustrates a flow chart of the logic programmed in signal processor 101. Initially, the image signal, which represents the image of the lines on the log, is input, in a bit mapped form or the like, to signal processor 101 from camera 14 (step S1). Then, signal processor 101 determines a present log position based on a signal from headblock position controller 102. Next, the image signal is threshold processed to determine the x and y coordinates of a plurality of points on each projected line (step S3). The relative z coordinate of each point can be determined by the distance between points on adjacent lines and the known camera geometry (step S4). The coordinate data is then downloaded to controller 100 (step S5). Controller 100 can position the log properly based on this coordinate data, size data of boards to be cut and known geometrical relationships.

Figure 7:
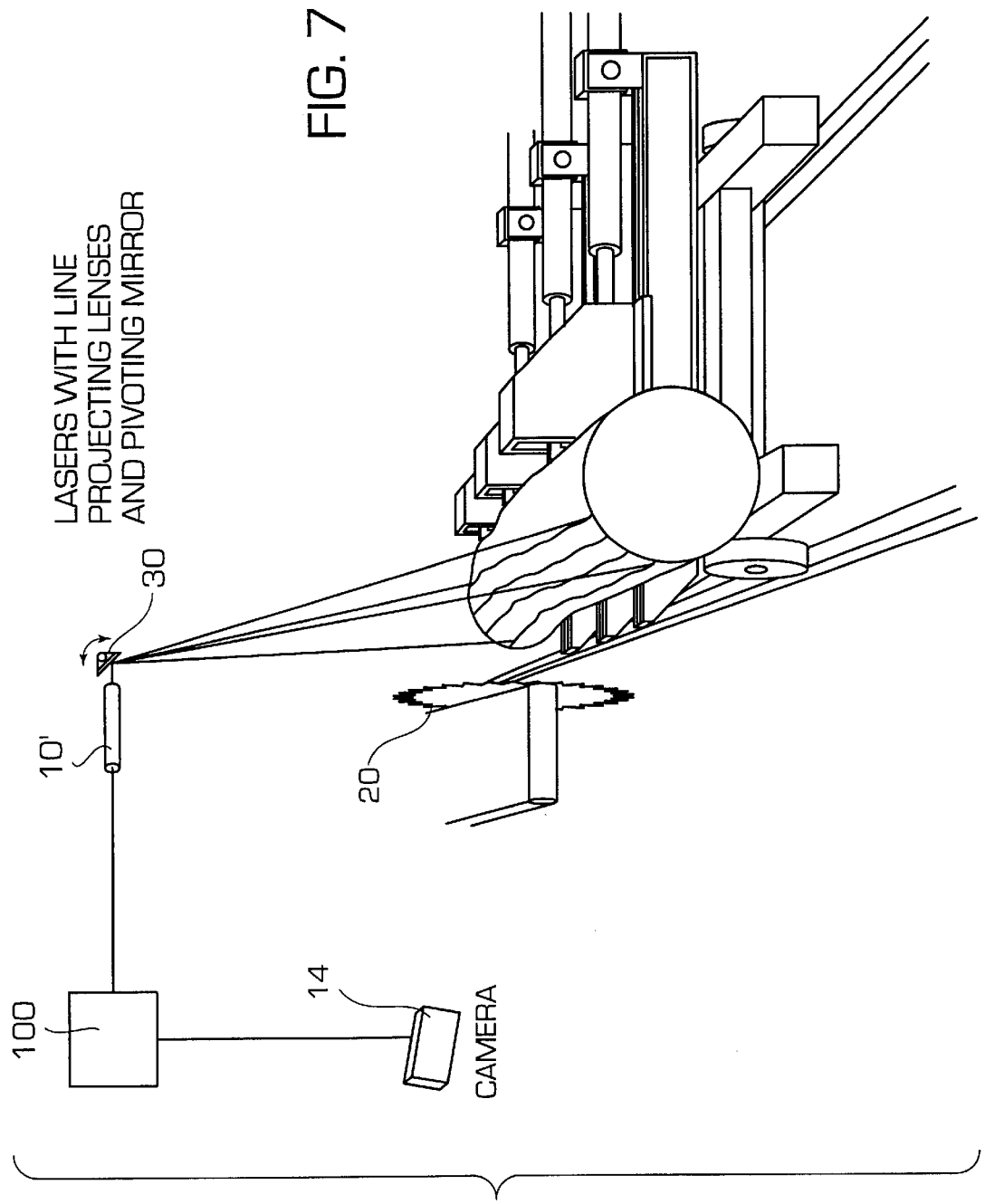
FIG. 7 illustrates a modification of the preferred embodiment which utilizes a single laser.

A second preferred embodiment is illustrated in FIG. 7. In this embodiment, a single line producing laser 10' is moved across the log to produce a plurality of lines on log L. Specifically, mirror 30 pivots to reflect the line produced by laser 10' to different positions on log L. These different positions are offset from one another in a direction which is perpendicular to the sawline. In this manner, a single line laser can be used to produce a plurality of lines. In the alternative, the single line laser can be directed toward the log and moved linearly in a direction perpendicular to the sawline in order to produce the plurality of lines on the log. Of course, laser 10' and/or camera 14 can be modulated by controller 100, in a known manner, in order to produce the proper lines on log L. For example, laser 10' can be deenergized while mirror 30 is pivoted or while laser 10' is moved or laser 10 can be color or brightness modulated. Alternatively, the signal from camera 14 can be processed to eliminate portions thereof which correspond to movement of laser 10' or mirror 30. Other portions of this embodiment are similar to the first embodiment described above and thus detailed description thereof has been omitted.

Figure 10:
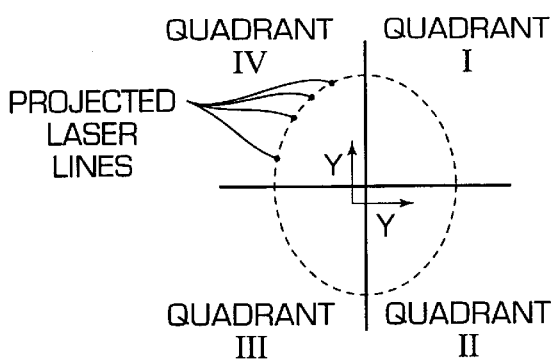
FIG. 10 illustrates a cylindrical object in cross section.

FIG. 10 illustrates a cross section of a scanned log. Data from one quadrant of the log, in this case quadrant IV, can be extrapolated to reconstruct the entire surface contour of the log. Further definition of the true shape of the log in three dimensions may be obtained by extending the described scanning to other quadrants of the log. This can be accomplished by adding cameras and extending the area covered by the projected lines.

Once the contour of the log has been determined, known geometrical relationships can be utilized to determine optimum log positioning and the headblocks can be positioned accordingly.

The preferred embodiments utilize line lasers. However any type device which can produce a line on the log can be used. For example, a raster scanning point laser or other light source can be used. The light can be visible or invisible as long as it can be detected by the camera. Also, any number of appropriate lines can be produced on the log. The primary aspect of the invention is that lines, which extend in a direction which is parallel to the sawline are produced on the log to allow the profile of the log to be determined in three dimensions.

The invention has been described through preferred embodiments. However, one skilled in the art will readily recognize that various modifications can be made without departing from the scope of the invention as defined by the appended claims.

The invention is applicable to determining the profile of any generally cylindrical object such as scanning the positioning logs in twin saws, quad saws, transverse saws, etc. . . The invention can also be used to scan cants or flitches in partially sawed logs before secondary processing to determine optimum positioning.

What is claimed:

1. A scanning system for determining dimensions and shape of an object, comprising:
    means for projecting at least one line onto a scanning area, said line extending in a first direction;
    means for projecting at least one line onto a scanning area, said line extending in a first direction;
    means for moving the object, in a second direction which is perpendicular to the first direction, into the scanning area;
    means for detecting an image formed on a surface of said object which is formed by said line; and
    means for monitoring a position of the object;
    wherein said detecting means includes:
        first means for detecting respective positions of the object from said monitoring means, when said image first appears on the object, at each of a plurality of predetermined points along the object as the object is moved into the scanning area by said moving means; and
        second means for detecting a straightness of the image when the image extends along an entire length of the object after the object has been moved into the scanning area.

2. A scanning system as claimed in claim 1, wherein said detecting means is a video camera.

3. A scanning system as claimed in claim 1, wherein said projecting means is at least one line laser device.

4. A scanning system as claimed in claim 3, further comprising:
    means for conveying the object in the first direction.

5. A scanning system as claimed in claim 1, wherein said means for projecting is a single line laser device.

6. A scanning system as claimed in claim 5, further comprising:
    means for moving said single line laser device in said second direction after said moving means moves the object into the scanning area to cause the image to be comprised of a plurality of image portions.

7. A scanning system as claimed in claim 5, further comprising:

moveable reflecting means for causing said line to move after said moving means moves the object into the scanning area to cause the image to be comprised of a plurality of image portions.

8. A headsaw device for cutting a log as the log is moved along its length in a first direction comprising:

a sawblade;

means for projecting at least one line onto a scanning area which is proximate said sawblade, said line extending in a first direction;

means for moving the log, in a second direction which is perpendicular to the first direction, toward said sawblade into the scanning area;

means for detecting an image formed on the log which is formed by said line;

means for conveying the log in the first direction to accomplish a sawing operation on the log; and means for monitoring a position of the log.

9. A scanning system for determining the dimensions and shape of a log to be cut by a headsaw, comprising:

means for projecting at least one line onto a scanning area, said line extending in a first direction;

means for moving the log, in a second direction which is perpendicular to the first direction, into the scanning area;

means for detecting an image formed on a surface of the log which is formed by said line;

means for monitoring a position of the log;

means for conveying the log relative to a blade of the headsaw in the first direction to accomplish a cutting operation on the log; and means for controlling the position of the log based on a position monitored by said monitoring means and the image detected by said detecting means to allow the cutting operation to cut a minimum portion of the log required to open a face of the log which is large enough to allow a subsequent cutting operation to produce a desired sized board.

\* \* \* \* \*